(12) United States Patent
Mettler (10) Patent No.: US 12,270,166 B2
(45) Date of Patent: Apr. 8, 2025

(54) LINK FOR FOLDABLE PORTABLE ROADWAY WARNING DEVICE

(71) Applicant: Plastic Safety Systems, Inc.

(72) Inventor: Charles M. Mettler, Perry, OH (US)

(73) Assignee: Plastic Safety Systems, Inc., Cleveland, OH (US)

( * ) Notice: Subject to any disclaimer, the term of this patent is extended or adjusted under 35 U.S.C. 154(b) by 959 days.

(21) Appl. No.: 17/042,451

(22) PCT Filed: Mar. 26, 2019

(86) PCT No.: PCT/US2019/024029
§ 371 (c)(1),
(2) Date: Sep. 28, 2020

(87) PCT Pub. No.: WO2019/191064
PCT Pub. Date: Oct. 3, 2019

(65) Prior Publication Data
US 2021/0079606 A1    Mar. 18, 2021

Related U.S. Application Data

(60) Provisional application No. 62/647,912, filed on Mar. 26, 2018.

(51) Int. Cl.
*E01F 9/529* (2016.01)
*F16B 2/24* (2006.01)
*F16B 19/02* (2006.01)

(52) U.S. Cl.
CPC .............. *E01F 9/529* (2016.02); *F16B 2/245* (2013.01); *F16B 19/02* (2013.01)

(58) Field of Classification Search
CPC .......... Y10T 16/547; E05D 3/06; E05D 3/12; E05D 5/128
See application file for complete search history.

(56) References Cited

U.S. PATENT DOCUMENTS

| | | | | |
|---|---|---|---|---|
| 654,190 | A | * 7/1900 | Thompson | A01K 1/0023 256/13 |
| 1,337,089 | A | * 4/1920 | Murray | A47G 29/1216 248/145 |

(Continued)

FOREIGN PATENT DOCUMENTS

| | | | | |
|---|---|---|---|---|
| CA | 2699164 | A1 * 10/2011 | | E01F 9/635 |
| DE | 102007027646 | B3 * 9/2008 | | E01F 9/529 |

(Continued)

OTHER PUBLICATIONS

International Search Report and Written Opinion for corresponding International Patent Application No. PCT/US2019/024029 mailed on Jun. 7, 2019.

*Primary Examiner* — Christopher J Sebesta
*Assistant Examiner* — Katherine J Chu
(74) *Attorney, Agent, or Firm* — Renner, Otto, Boisselle & Sklar, LLP (57) ABSTRACT

A portable roadway warning device comprises one or more rumble strips. Each rumble strip comprises at least two modular strip sections, each made of a polymeric material having top and bottom surfaces and end edges and side edges. At least one of the end edges of each of the strip sections has a plurality of aligned alternating notches and tabs, and connecting links hingedly connecting the tabs at one of the end edges of one of the strip sections to respective aligned tabs at one of the end edges of another of the strip sections. Each connecting link includes a U-shape link plate bracket and a pair of frangible rods that are configured to break at less than the tear strength of the polymeric modular strip sections.

13 Claims, 4 Drawing Sheets

(56) References Cited

U.S. PATENT DOCUMENTS

| | | | | |
|---|---|---|---|---|
| 3,886,519 | A * | 5/1975 | Hovland | G08G 1/0955 116/63 P |
| 4,070,716 | A * | 1/1978 | Satt | A47D 13/063 5/99.1 |
| 4,542,558 | A * | 9/1985 | Brockhaus | E05D 7/105 16/386 |
| 4,852,847 | A * | 8/1989 | Pagel | A47G 29/1216 248/548 |
| 4,923,319 | A * | 5/1990 | Dent | E01F 9/635 411/389 |
| 5,165,818 | A * | 11/1992 | Newhart | E01F 9/635 404/10 |
| 5,537,713 | A * | 7/1996 | Docteur | E05D 5/128 16/221 |
| 5,775,834 | A * | 7/1998 | Jackson | E01F 9/70 116/63 P |
| 6,309,137 | B1 * | 10/2001 | Hirsch | E01F 9/529 404/15 |
| 8,385,991 | B2 * | 2/2013 | Wang | G06F 1/1681 455/90.3 |
| 11,459,713 | B2 * | 10/2022 | Evans | E01F 9/61 |
| 11,583,466 | B1 * | 2/2023 | McGee | A61H 3/00 |
| 2003/0115717 | A1 * | 6/2003 | Van Parys | E05D 5/125 16/229 |
| 2010/0205778 | A1 * | 8/2010 | Duan | F16B 21/186 16/386 |
| 2013/0194741 | A1 * | 8/2013 | Uchiyama | G06F 1/1681 361/679.02 |
| 2013/0283567 | A1 * | 10/2013 | Yamaguchi | E05D 7/04 16/260 |
| 2015/0030390 | A1 * | 1/2015 | Brown | E01F 9/529 404/15 |
| 2016/0018012 | A1 * | 1/2016 | Kamp | F16K 15/038 16/386 |
| 2016/0130850 | A1 * | 5/2016 | Mohr | E05D 3/02 29/11 |

FOREIGN PATENT DOCUMENTS

| | | |
|---|---|---|
| JP | 2012-193603 | 10/2012 |
| WO | 2011/025154 | 3/2011 |
| WO | 2015/013237 | 1/2015 |

* cited by examiner

LINK FOR FOLDABLE PORTABLE ROADWAY WARNING DEVICE

This application is a national phase of International Application No. PCT/US2019/024029 filed Mar. 26, 2019, which claims benefit of U.S. Provisional Application No. 62/647,912 filed on Mar. 26, 2018 and published in the English language.

FIELD OF THE INVENTION

This invention relates generally to a portable roadway warning device comprising any desired number of portable modular rumble strips for use in various roadway conditions to alert drivers of automotive vehicles including both passenger vehicles and trucks of an approaching condition.

BACKGROUND

Transportation engineers use rumble strips in roadway applications to provide a perceptible noise and warning vibration when driven over by automotive vehicles, including passenger vehicles and trucks. The noise and vibration from driving over rumble strips warn the drivers of an approaching condition such as a work site, construction site, slow speed zone, checkpoint, tollbooth and so on, without alarming the drivers and without adversely affecting the stability of the vehicles. Some types of rumble strips are intended to be permanently installed for long-term use while others are intended to be portable for use at work zones and other applications of relatively short duration.

Portable rumble strips may be provided in a segmented configuration, with multiple segments connected end-to-end to extend across a full lane of traffic. These segments need to be connected together in such a way that the segments do not separate as vehicles drive over the rumble strips at up to highway speeds. Some segmented portable rumble strips are hinged, for example, and the hinges must be strong enough not to come apart as vehicles drive over the rumble strips. The hinges must not only hold the rumble strip segments together to maintain the integrity of the rumble strip across the lane of traffic, but also not to allow the segments to separate in such a manner that they generate sharp or loose elements that could damage a vehicle's tires or otherwise damage a vehicle if picked up off the roadway.

SUMMARY

The inventors discovered that while existing rumble strip hinges generally were strong enough to hold rumble strip sections together in use, the most common mode of failure was in tearing out of the rumble strip section. In other words, in segmented rumble strips with rumble strip sections connected by hinges, the hinges were stronger than the connecting material of the rumble strip sections. Rumble strip sections damaged in this manner are difficult or impossible to repair. Rather than increase the strength of the rumble strip sections, the present invention provides a hinge for a portable segmented rumble strip that will fail before a rumble strip can be damaged. More particularly, the hinge provided by the invention includes frangible hinge pins that will fail before the polymeric material of the rumble strip section to which it is attached. The frangible pins also are intended to minimize the potential damage to vehicles driving over the failed hinge. [PSS first tried to increase the strength of the tabs, results were unsatisfactory.]

More particularly, the present invention provides a rumble strip that includes at least two longitudinally-extending modular strip sections. Each of the strip sections is made of a polymeric material and has spaced apart top and bottom surfaces, longitudinally-spaced end edges, and laterally-spaced side edges. At least one of the end edges of each of the strip sections has a plurality of laterally-spaced tabs, with each tab having a laterally-extending through-hole. The rumble strip also includes a plurality of connecting links hingedly connecting the tabs at one of the end edges of one of the strip sections to respective aligned tabs at one of the end edges of another of the strip sections. The connecting links include a link plate bracket and a pair of frangible pins extending through the through-holes of respective tabs to pivotally connect the strip sections through the corresponding link plate bracket.

The through-holes in the tabs at at least one of the end edges of each of the strip sections may be laterally aligned and axially inwardly spaced from respective distal ends of the tabs.

The frangible pins in each of the connecting links may be longitudinally-spaced and parallel.

The frangible pins may have opposite ends extending outwardly beyond respective ends of the through holes.

At least one of the end edges of each of the strip sections may have at least two tabs that are hingedly connected by respective connecting links to respective aligned tabs of another of the strip sections.

At least one of the end edges of each of the strip sections may have four tabs that are hingedly connected by respective connecting links to respective aligned tabs of another of the strip sections.

Each of the strip sections may be made of rubber.

The device of claim 1, wherein a plurality of metal plates or bars are embedded in or otherwise secured to each of the strip sections to provide ballast to the strip sections, each of the plates or bars running transversely between the side edges of the strip sections in laterally spaced relation from one another.

Each of the strip sections may have a length of between approximately five feet and approximately six feet, and may have a length of approximately five and one-half feet.

Each of the strip sections may have a width of approximately twelve inches and a thickness of approximately three-quarter inch.

The present invention also provides a kit that includes a connecting link for connecting a pair of longitudinally-extending modular strip sections of a rumble strip as described herein. Each of the strip sections has spaced apart top and bottom surfaces, longitudinally-spaced end edges, and laterally-spaced side edges, at least one of the end edges of each of the strip sections has a plurality of laterally-spaced tabs, and each tab having a laterally-extending through-hole, the connecting link comprising a U-shape link bracket having a pair of spaced-apart link plate sections extending in a common direction from a center section. Each of the link plate sections has a pair of spaced-apart openings aligned with corresponding openings in an opposing link plate section aligned along parallel axes. The connecting link further includes a pair of frangible rods extendable through respective aligned ones of the openings in the opposing link plate sections, and a spring clip configured to engage an end of the frangible rods to prevent the rods from being drawn back through the openings in the link plate sections of the bracket.

Each rod may include an enlarged head at a proximal end that is configured to have a diameter that is larger than a diameter of at least one of the openings in the link plate sections of the bracket.

Each rod may include an annular groove near a distal end of the rod, and the spring clip may be configured to engage the annular groove perpendicular to the parallel axes The foregoing and other features of the invention are hereinafter fully described and particularly pointed out in the claims, the following description and annexed drawings setting forth in detail a certain illustrative embodiment of the invention. The illustrated embodiment is indicative, however, of but one of the various ways in which the principles of the invention may be employed.

BRIEF DESCRIPTION OF THE DRAWINGS

In the accompanying drawings and description, the same or similar reference characters are used to refer to the same or similar features shown in different figures.

DETAILED DESCRIPTION

Figures 1, 2, 3:
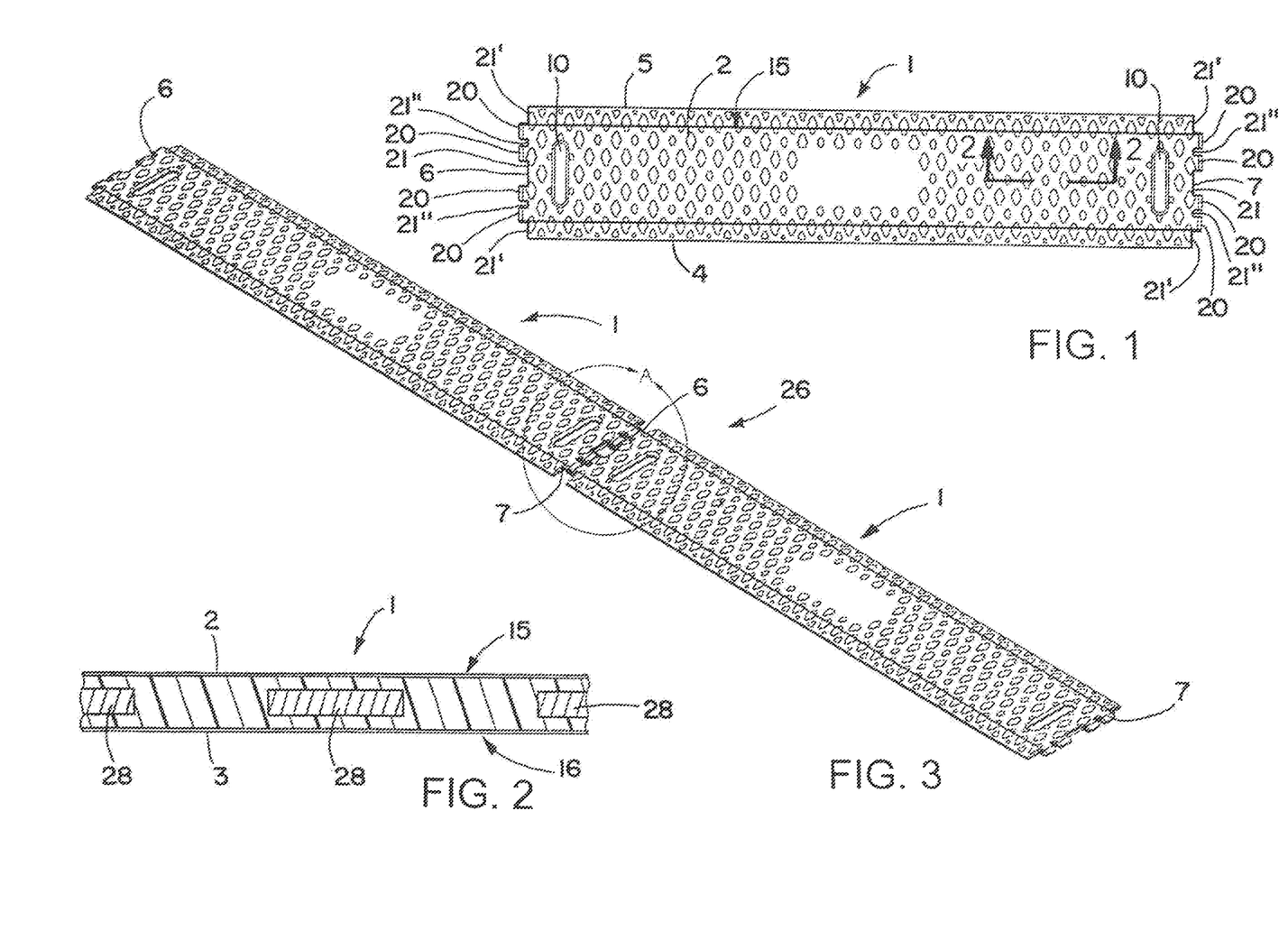
FIG. 1 is a top plan view of one form of modular strip section of the present invention.
FIG. 2 is an enlarged fragmentary longitudinal section through a portion of the strip section of FIG. 1, taken on the plane of the line 2-2 thereof.
FIG. 3 is a perspective top view of a modular rumble strip of the present invention comprising two of the strip sections of FIG. 1 hingedly connected together in end to end relation to one another.

Referring now more particularly to the drawings, and initially to FIGS. 1 and 2, the drawings show a portable segmented rumble strip having multiple sections that are hingedly connected to one another for use in various roadway conditions to alert drivers of automotive vehicles, including both passenger vehicles and trucks, of an approaching condition such as a work site, slow speed zone, checkpoint, tollbooth, or any other area where traffic speed is temporarily reduced. While existing rumble strip hinges often have been strong enough to hold rumble strip sections together in use, in unusually stressful conditions the hinges tend to fail by tearing out of the material that forms the rumble strip section. Rumble strip sections damaged in this manner are difficult or impossible to repair. Rather than increase the strength of the rumble strip material, the present invention provides a hinge for a portable segmented rumble strip that will fail before the rumble strip section can be damaged. Moreover, the hinge also is intended to minimize the potential damage to vehicles driving over the failed hinge. More particularly, the hinge provided by the invention includes frangible hinge pins that will fail before the material of the rumble strip section to which it is attached.

Turning to a description of an exemplary portable rumble strip formed from multiple sections, each strip section 1 desirably has substantially flat top and bottom surfaces 2 and 3 and opposite side edges 4 and 5 and end edges 6 and 7. Also each strip section is desirably made of a suitable high strength, weather-resistant polymeric material such as rubber or polyurethane or other polymeric material or combination of materials with similar properties. Suitable hand grip slots 10 may be provided in each rumble strip section adjacent one or both ends for ease of picking the rumble strip sections up.

Although the dimensions of each rumble strip section 1 may vary, an exemplary rumble strip section has a width that is generally between approximately eight inches (20.32 cm) and approximately sixteen inches (40.64 cm), and more particularly of approximately thirteen inches (33.02 cm). Also each rumble strip section is of sufficient thickness to create a noticeable audible and vibration warning to drivers of automotive vehicles when driven over the rumble strip sections, but not so severe as to alarm the drivers, and without adversely affecting the stability of the vehicles. To that end, each rumble strip section typically has a thickness of between approximately one-half inch (1.27 cm) and approximately one inch (2.54 cm), and more particularly of approximately three-quarter inch (1.91 cm).

The leading side edge 4 or 5 of each rumble strip section that faces oncoming vehicle traffic or both side edges 4 and 5 of each rumble strip section may be beveled to help eliminate any possible movement of the rumble strips caused by initial contact of the vehicle tires with the rumble strips. The included angle of the beveled leading side edge 4 or 5 or both side edges 4 and 5 of the rumble strip sections is preferably between approximately ten degrees (10°) and approximately fifteen degrees (15°), and more preferably approximately twelve degrees (12°).

As seen for example in FIG. 1, each strip section 1 has aligned alternating tabs 20 and notches 21, 21' and/or 21" in longitudinally-spaced opposite end edges 6 and 7 for connecting the end edges of two or more strip sections together to form a rumble strip of any desired length.

In one form of the invention, each of the individual strip sections 1 preferably has a length of between approximately five feet (152.4 cm) and approximately six feet (182.88 cm), and more preferably approximately five and one-half feet (167.4 cm), whereby a rumble strip 26 comprised of two strip sections 1 hingedly connected together in end-to-end relation as shown in FIG. 3 will be of sufficient length to reach across a single highway lane, which in the United States is typically approximately eleven feet wide (335.28 cm). Each of the individual strip sections 1 may be somewhat longer or shorter than that or of different lengths if desired. Also more than two modular strip sections may be used to make up a single rumble strip if desired. A single rumble strip comprised of two modular strip sections hingedly joined together, each having a length of approximately five and one-half feet (167.4 cm), can easily be folded in half with the folded strip sections in overlying relation to one another with their top surfaces facing each other, and can easily be fitted in the bed of a pickup truck for easy transport and deployment. This makes the rumble strips particularly easy to deploy and remove and reuse for work zones of relatively short duration.

If each rumble strip 26 comprised of two (or more) strip sections 1 hingedly connected together is found not to be heavy enough to remain in place under heavy traffic, a plurality of laterally spaced, transversely extending metal plates or bars 28, preferably made of steel or cast iron, may be embedded within each rumble strip section as schematically shown in FIG. 2 to provide the necessary ballast to keep each rumble strip in place without having to use any adhesive or fasteners. The number and combined weight of the individual plates or bars 28 embedded in the strip sections 1 should be sufficient to cause the rumble strips to stay in place under heavy traffic, but not make the rumble strips so heavy they cannot easily be folded in half and moved by two persons. For example, the overall weight of each strip section that is approximately five and one-half feet (167.4 cm) in length may be between approximately fifty pounds (22.7 kg) and approximately sixty pounds (27.2 kg) and more preferably approximately fifty-five pounds (24.9 kg), whereby the overall weight of a rumble strip comprised of two strip sections hingedly connected that are each approximately five and one-half feet (167.4 cm) in length will be between approximately one hundred pounds (45.4 kg) and approximately one hundred twenty pounds (54.4 kg) and more preferably approximately one hundred ten pounds (49.9 kg).

Figure 4:
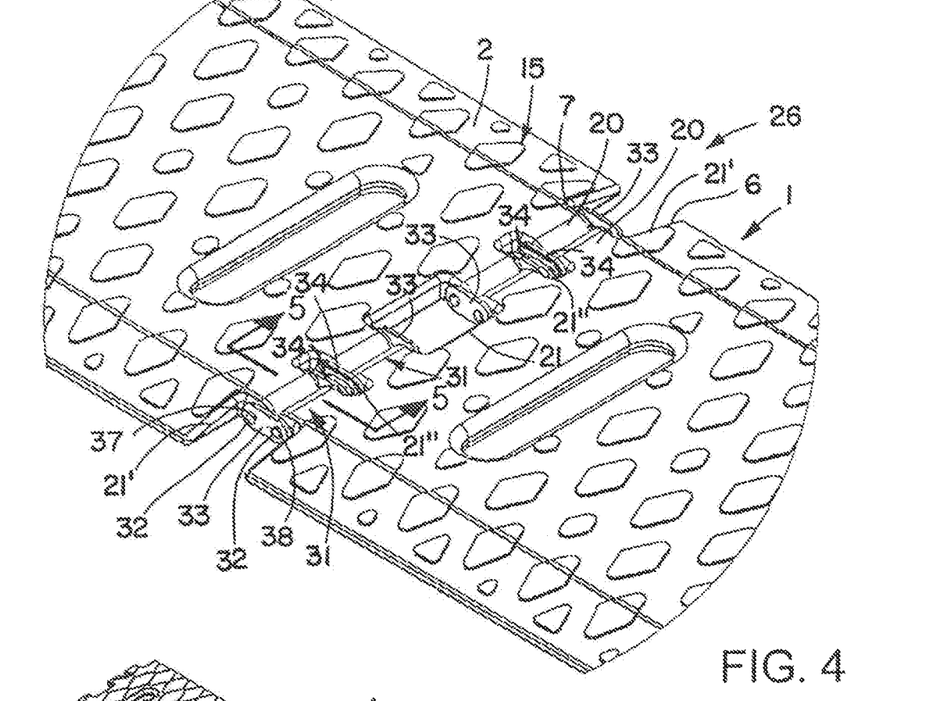
FIG. 4 is an enlarged fragmentary top perspective view of the encircled area A of the hingedly connected end edges of the two strip sections of FIG. 3.
Figure 5:
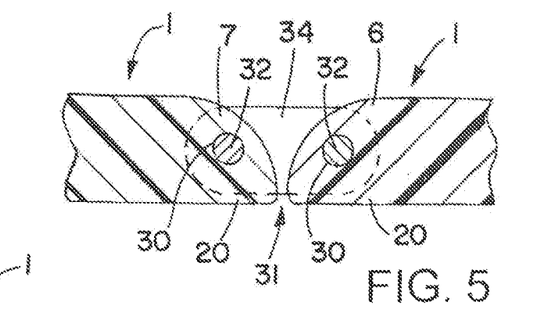
FIG. 5 is a further enlarged fragmentary longitudinal section through the hingedly connected end edges of the two strip sections of FIG. 4, taken on the plane of the line 5-5 thereof.
Figure 6:
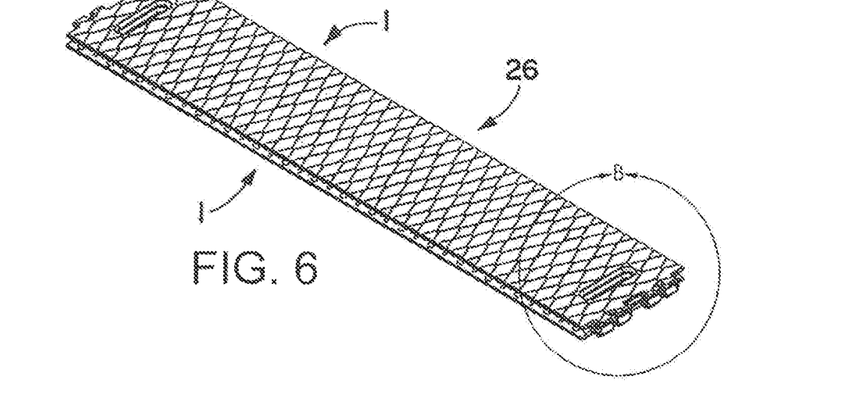
FIG. 6 is a perspective top view of the modular rumble strip of FIG. 3 but showing the two hingedly connected strip sections folded in overlying relation to one another.

As seen for example in FIGS. 4 and 5, the tabs 20 at the respective end edges 6 and 7 of each of the strip sections 1 have laterally-extending through holes 30, laterally aligned and axially inwardly spaced from their respective distal end edges to facilitate hingedly connecting the tabs 20 at one of the end edges 6 of one of the strip sections to respective aligned tabs 20 at end edges 7 of another of the strip sections using suitable connecting links 31.

In the example disclosed herein, each connecting link 31 desirably comprises two laterally-spaced parallel rods 32, alternatively referred to as pins, extending through the respective through holes 30 in the aligned tabs 20 at the one and the another end edges of the one and the another strip sections. Each of the rods 32 has opposite ends extending outwardly beyond respective ends of the through holes 30. Attached to the respective opposite ends of the two rods are a pair of link plates 33 and 34 to maintain a desired lateral spacing between the two rods 32 of each connecting link 31 that is slightly greater than the spacing between the through holes 30 in the respective aligned tabs 20 when the one and the other end edges of the one and the another strip sections are in substantially parallel alignment with one another as shown in FIGS. 4 and 5.

Figures 7, 8, 9:
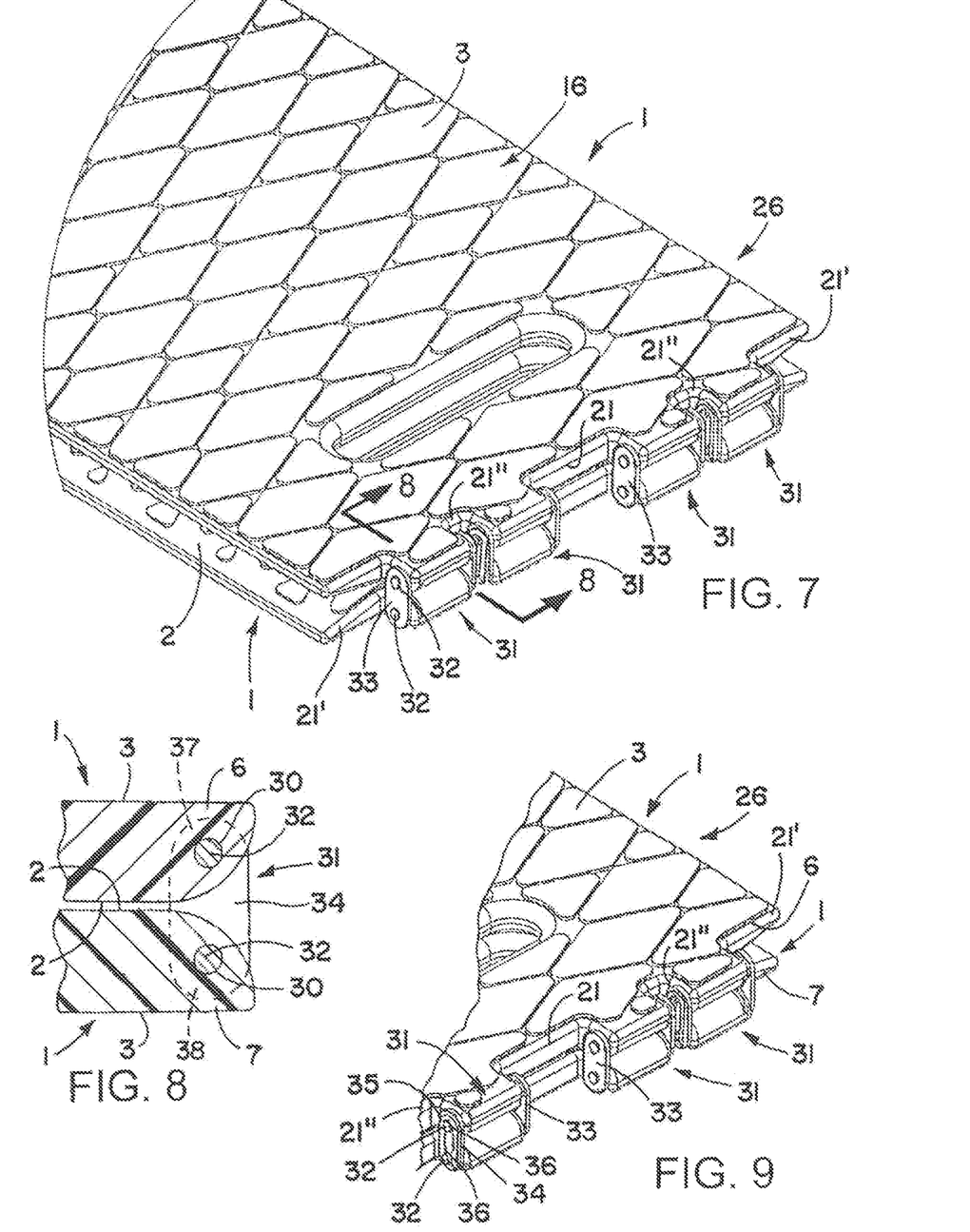
FIG. 7 is an enlarged fragmentary top perspective view of the encircled area B of the hingedly connected end edges of the two strip sections of FIG. 6 folded in overlying relation to one another.
FIG. 8 is a further enlarged fragmentary longitudinal section through the hingedly connected end edges of the two folded over strip sections of FIG. 7, taken on the plane of the line 8-8 thereof.
FIG. 9 is an enlarged top perspective view of a portion of the hingedly connected end edges of the two folded over strip sections of FIG. 7.

One of the link plates 33 may be permanently attached to one of the ends of the two rods 32, whereas the other link plate 34 desirably has a slip fit over the other ends of the two rods, and may be releasably secured to the other ends by a connecting pin 35 that may be transversely slidably received in aligned annular grooves 36 in the other ends of the two rods outwardly of the link plate 34 when the two modular strip sections 1 are placed one on top of another with their top surfaces 2 facing each other as shown in FIGS. 7-9 for ease of attachment of the connecting links to the aligned tabs of the two strip sections.

Each of the link plates 33 and 34 of the connecting links 31 used to hingedly connect two or more strip sections 1 together desirably has a width no greater than the thickness of the strip sections, whereby when the joined strip sections are placed on the ground in parallel alignment with one another as schematically shown in FIGS. 3-5, the link plates will not interfere with the flat placement of the strip sections against the ground or interfere with automotive vehicle tires passing over the hingedly connected strip sections.

Also each of the link plates 33 and 34 has opposite end portions 37 and 38 extending radially outwardly beyond the respective rods 32 when connected thereto a length no greater than one-half the thickness of the strip sections, whereby when the strip sections are folded one on top of another (with their top surfaces 2 facing each other), the ends of the link plates won't extend outwardly beyond the bottom surfaces 3 of the interconnected strip sections as shown in FIG. 8 so as not to interfere with the stacking of multiple folded interconnected strip sections one on top of another. Likewise, the notches 21, 21' and/or 21" adjacent opposite sides of the tabs 20 have a depth slightly greater than the length of the end portions 37, 38 of the link plates 33, 44 extending radially outwardly beyond the respective rods 32 to allow for the folding of the interconnected strip sections in overlying relation to one another.

In the example shown herein, wherein four hingedly connected tabs 20 are provided at the end edges of the respective strip sections, the centermost notch 21 between two of the tabs 20 at the end edges of each of the strip sections has a width slightly greater than the length of the two rods 32 of the respective connecting links 31 to facilitate insertion of the free ends of the rods 32 of the respective connecting links through the through holes 30 in the respective aligned tabs 20 of the strip sections as best seen in FIGS. 4, 7 and 9. The outermost notches 21' desirably extend all the way out to the side edges 4, 5 of the strip sections to facilitate insertion of the free ends of the rods 32 of the connecting links 31 used to hingedly connect the outermost tabs of two strip sections together as also best seen in FIGS. 4, 7 and 9. The notches 21" between the inner and outermost tabs 20 need only have a width sufficient to accommodate the free ends of the rods of the two connecting links connecting the inner and outermost tabs together and the respective link plates 34 that have a slip fit over the free ends of the respective rods and are releasably secured to the free ends by transversely slidably inserting the connecting pins 35 in the aligned grooves 36 in the free ends of the respective rods outwardly of the respective slip-on link plates when the strip sections are folded one on top of another as shown in FIG. 9.

Figure 10:
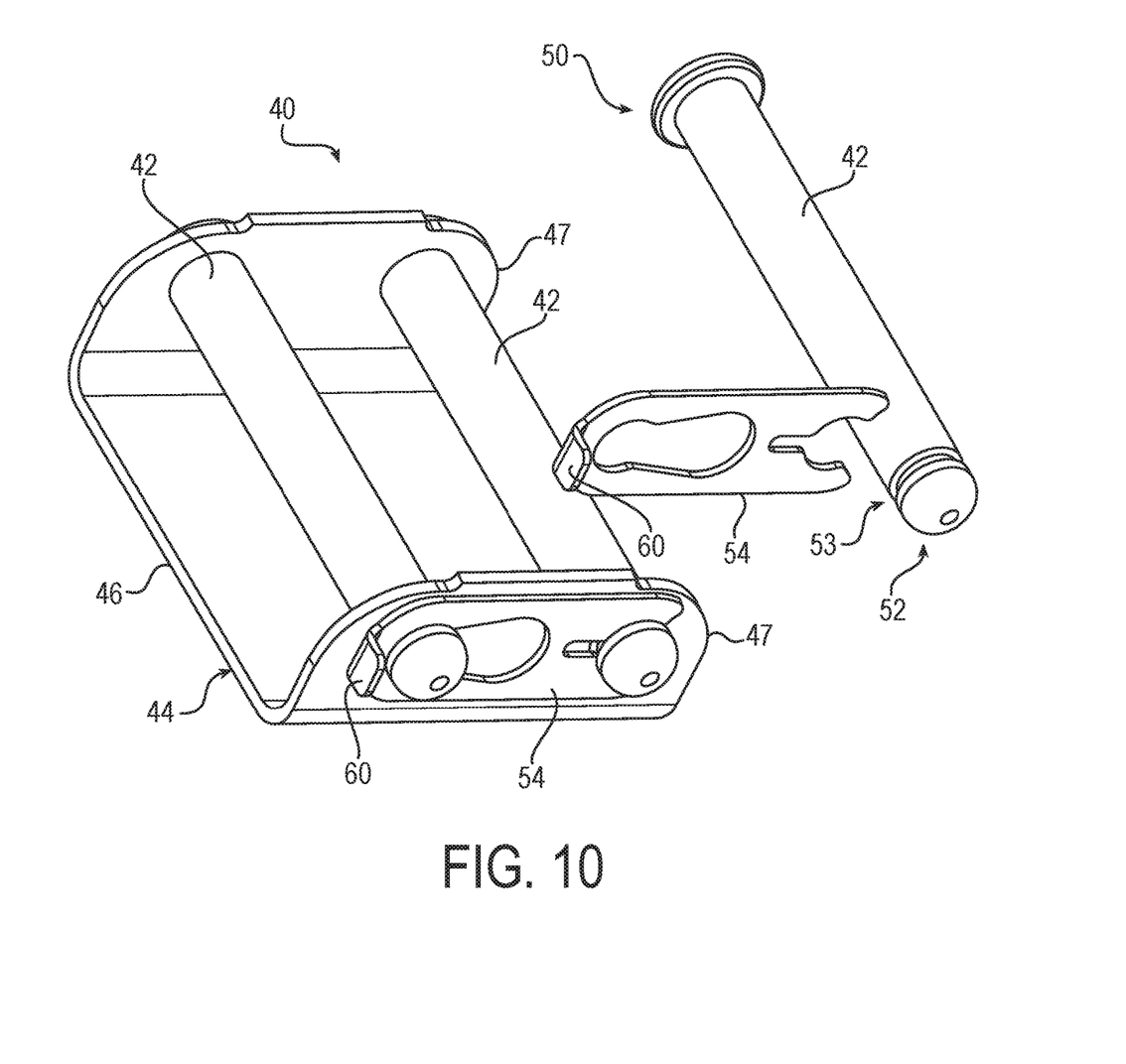
FIG. 10 is an enlarged perspective view of an alternative link assembly provided by the present invention, and a link pin and a link plate used in the link assembly.

An alternative connecting link 40 is shown in FIG. 10, and performs a similar function as the connecting link 31 shown, for example, in FIGS. 4, 7, and 9, to hingedly connect one of the tabs 20 at one of the end edges 6 of one of the strip sections to a respective laterally-aligned one of the tabs 20 at end edges 7 of another of the strip sections. The connecting link 40 also may be referred to as a link assembly and may form part of a kit for replacing broken or damaged connecting links. Similar to the connecting links 31, the connecting link 40 includes a pair of parallel rods 42, alternatively referred to as pins, extending through the respective through holes 30 in the aligned tabs 20 of respective strip sections. Each of the rods 42 is configured to have a length sufficient to extend through the through holes 30, with opposite ends extending outwardly beyond respective ends of the through holes 30.

Rather than a pair of link plates, the connecting link 40 includes a single U-shape link plate bracket 44 having a center section 46 configured to extend from one side of the respective tabs 20 to an opposing side of the tabs 20, and link plate sections 47 connected to and extending in a common direction from the center section 46 past the respective through-holes 30. A pair of openings in the link plate sections 47 correspond to and may be aligned with respective opposing ends of the through holes 30 in the tabs 20. The U-shape bracket thus effectively incorporates a pair of link plates into the bracket 44 and defines a spacing between the link plate sections 47. Accordingly, the bracket 44 also is configured to maintain a desired spacing between the two parallel rods 42 of each connecting link 40 that is slightly greater than the spacing between the through holes 30 in the respective aligned tabs 20 when the respective end edges of the strip sections are in substantially parallel alignment with one another as shown in FIGS. 4 and 5. Additionally, the center section 46 of the connecting link 40 ensures that the connected sections of the rumble strip only fold in one direction.

The rods 42 are not permanently attached to the link plate bracket 44. The openings in the link plate sections 47 of the link plate bracket 44 are configured to provide a slip fit for the rods 42. Each rod includes an enlarged-diameter head 50 at one end, a proximal end, that is configured to be oversized relative to the openings in the link plate sections 47 of the link plate bracket 44 such that the head 50 will not pass through the opening. The rods 42 thus extend through the spaced-apart link plate sections 47 of the link plate bracket 44 from one side to the other, with the head 50 retained on an outer side of one link plate section 47 and a distal end 52 of the rod 42 spaced from the head 50 to extend through a respective opening in a respective link plate section 47. Near the distal end 52 of the rod 42, the rod 42 has an annular groove 53 or other retention means for engaging the rod 42 and preventing it from being drawn back through the openings in the link plate section 47 of the bracket 44. The rods 42 preferably are made of a material that fails, in other words, breaks, before the material that forms the tab fails. A suitable material for the rods 42 may include a nylon.

The connecting link 40 further includes a spring clip 54 configured to receive and secure the distal ends 52 of the respective pair of rods 42, similar to the connecting pin 35 described above. The illustrated spring clip 54 is planar and includes a keyhole slot 56 for receiving and capturing the distal end 52 of one of the rods 42, and an outwardly-opening spring-clip end 57 for releasably receiving and capturing the distal end 52 of the other of the rods 42. Sliding the spring clip 54 in a direction perpendicular to the parallel rods 42 engages the annular groove 48 or other retention means and fixes the rods 42 in place relative to the link bracket 44. The spring clip 54 may include a tab 60, as shown, extending out of the plane of the body of the spring clip 54 to facilitate moving the spring clip 54 into and out of engagement with the rods 42 to releasably secure the rods 42 in the bracket 44 of the connecting link 40. The spring clip 54 thus facilitates installing and removing the connecting links 40. An exemplary spring clip 54 may be made of spring steel.

Moreover, the rods 42 are frangible and are configured to fail under a force that is lower than the force necessary to pull the rod 42 through the material forming the tab 20, through which the rod 42 extends, thus ensuring failure of the rod 42 before the tab 20 is damaged. More preferably, the rod 42 is configured to fail at half the failure strength of the material of the tab 20. If stronger rods were used, there is a risk that the rod could tear through the material forming the tab 20, after which the tab 20 may be difficult or impossible to repair. By incorporating the frangible rod 42, the invention ensures that the rod 42 will fail before the material in the tab 20 through which the pin extends. Replacing a rod is a straightforward matter, not to mention much less expensive and more environmentally responsible than replacing an entire section of the rumble strip due to a damaged tab 20.

In summary, the present invention provides a connecting link 40 for connecting a pair of longitudinally-extending modular strip sections 1 of a rumble strip 26. As described above, each of the strip sections 1 has spaced apart top and bottom surfaces 2 and 3, longitudinally-spaced end edges 6 and 7, and laterally-spaced side edges 4 and 5. At least one of the end edges 6 and 7 of each of the strip sections 1 has a plurality of laterally-spaced tabs 20, and each tab 20 has a laterally-extending through-hole 30. The connecting link 40 includes a U-shape link bracket 44 having a pair of spaced-apart link plate sections 47 extending in a common direction from a center section 46. Each of the link plate sections 47 has a pair of spaced-apart openings aligned with corresponding openings in an opposing link plate section 47, aligned along parallel axes. The connecting link 40 also includes a pair of frangible rods 42 extendable through respective aligned ones of the openings in the opposing link plate sections 47, and a spring clip 54 configured to engage an end of the frangible rods 42 to prevent the rods 42 from being drawn back through the openings in the link plate sections 47 of the bracket 44. Each rod 42 may include an enlarged head 50 at a proximal end that is configured to have a diameter that is larger than a diameter of at least one of the openings in the link plate sections 47 of the bracket 44. And each rod 42 may include an annular groove 53 near a distal end 52 of the rod 42, with the spring clip 54 configured to engage the annular groove 53 perpendicular to the parallel axes of the rods 42 received in the openings in the link plate sections 47 of the bracket 44.

Although the invention has been shown and described with respect to a certain embodiment, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiments of the invention. In addition, while a particular feature of the invention may have been disclosed with respect to only one embodiment, such feature may be combined with one or more other features as may be desired or advantageous to any given or particular application.

The invention claimed is:

1. A portable roadway warning device that includes a rumble strip having at least two longitudinally-extending modular strip sections, each of the strip sections being made of a polymeric material having spaced apart top and bottom surfaces, longitudinally-spaced end edges, and laterally-spaced side edges, wherein at least one of the end edges of each of the strip sections has a plurality of laterally-spaced tabs, each tab having a laterally-extending through-hole, and a plurality of connecting links hingedly connecting the tabs at one of the end edges of one of the strip sections to respective aligned tabs at one of the end edges of another of the strip sections, the connecting links including a link plate bracket and a pair of frangible pins that will fail before the polymeric material of the rumble strip section to which they are attached, extending through the through-holes of respective tabs to pivotally connect the strip sections through the corresponding bracket, wherein the link plate bracket includes a center section configured to extend from one lateral side of the tab to an opposing lateral side of the tab such that the pivotally connected strip sections can fold in only one direction when the strip sections are arranged in an end-to-end alignment, the center section providing a physical interference limiting rotation of the tab in a direction opposite the one direction, the link plate bracket limiting rotation of the two strip sections connected to the link plate bracket in the direction opposite the one direction to about 180 degrees relative to each other to prevent the end edges of each of the strip sections connected to the link plate bracket from folding beyond 180 degrees and lifting vertically away from a roadway surface.

2. The device of claim 1, wherein the through-holes in the tabs at at least one of the end edges of each of the strip sections are laterally aligned and axially inwardly spaced from respective distal ends of the tabs.

3. The device of claim 1, wherein the frangible pins in each of the connecting links are longitudinally-spaced and parallel.

4. The device of claim 1, wherein the frangible pins have opposite ends extending outwardly beyond respective ends of the through holes.

5. The device of claim 1, wherein at least one of the end edges of each of the strip sections has at least two tabs that are hingedly connected by respective connecting links to respective aligned tabs of another of the strip sections.

6. The device of claim 5, wherein the at least one of the end edges of each of the strip sections has four tabs that are hingedly connected by respective connecting links to respective aligned tabs of another of the strip sections.

7. The device of claim 1, wherein each of the strip sections is made of rubber.

8. The device of claim 1, wherein each of the strip sections has a length of between approximately five feet and approximately six feet.

9. The device of claim 8, wherein each of the strip sections has a length of approximately five and one-half feet.

10. The device of claim 1, wherein each of the strip sections has a width of approximately twelve inches and a thickness of approximately three-quarter inch.

11. The device of claim 1, wherein the link plate bracket has a U-shape formed by a pair of spaced-apart link plate sections extending in a common direction from a center section, each of the link plate sections having a pair of spaced-apart openings aligned with corresponding openings in an opposing link plate section aligned along parallel axes, a pair of frangible rods extendable through respective aligned ones of the openings in the opposing link plate sections, and a spring clip configured to engage an end of the frangible rods to prevent the rods from being drawn back through the openings in the link plate sections of the bracket.

12. The device of claim 11, wherein each rod includes an enlarged head at a proximal end that is configured to have a diameter that is larger than a diameter of at least one of the openings in the link plate sections of the bracket.

13. The device of claim 11, wherein each rod includes an annular groove near a distal end of the rod, and the spring clip is configured to engage the annular groove perpendicular to the parallel axes.

\* \* \* \* \*